(12) United States Patent
Gustafson

(10) Patent No.: US 8,151,605 B1
(45) Date of Patent: Apr. 10, 2012

(54) TRAILER LOCK

(76) Inventor: Kenneth G. Gustafson, Jackson, CA (US)

( * ) Notice: Subject to any disclaimer, the term of this patent is extended or adjusted under 35 U.S.C. 154(b) by 0 days.

(21) Appl. No.: 13/046,727

(22) Filed: Mar. 12, 2011

Related U.S. Application Data

(63) Continuation-in-part of application No. 12/462,446, filed on Aug. 4, 2009, now abandoned.

(51) Int. Cl.
*B60D 1/28* (2006.01)
*E05B 73/00* (2006.01)

(52) U.S. Cl. .............. 70/14; 70/32; 70/258; 70/461; 280/507

(58) Field of Classification Search .......... 70/14, 32–34, 70/58, 232, 258, 229, 230, 234, 235, 461; 280/507, 515
See application file for complete search history.

(56) References Cited

U.S. PATENT DOCUMENTS

| | | | |
|---|---|---|---|
| 3,226,133 A * | 12/1965 | Geresy ........................ | 280/507 |
| 4,380,160 A * | 4/1983 | Hoffman ..................... | 70/14 |
| 4,571,964 A * | 2/1986 | Bratzler ...................... | 70/58 |
| 5,087,064 A * | 2/1992 | Guhlin ........................ | 280/507 |
| 5,181,405 A * | 1/1993 | Wheeler ...................... | 70/232 |
| 5,195,339 A * | 3/1993 | Nee et al. ................... | 70/14 |
| 5,255,545 A * | 10/1993 | Wheeler ...................... | 70/232 |
| 5,322,316 A * | 6/1994 | Wheeler ...................... | 280/507 |
| 5,332,251 A | 7/1994 | Farquhar | |
| 5,410,893 A | 5/1995 | Easterwood | |
| 5,513,871 A * | 5/1996 | Johnson ...................... | 280/507 |
| 5,520,030 A * | 5/1996 | Muldoon ..................... | 70/14 |
| 6,244,614 B1 * | 6/2001 | Bonvillain et al. .......... | 280/507 |
| 6,315,315 B1 * | 11/2001 | Seale .......................... | 280/507 |
| 6,467,317 B1 | 10/2002 | Hillabush et al. | |
| 6,578,392 B1 * | 6/2003 | Bowman et al. ............ | 70/14 |
| 6,698,256 B2 * | 3/2004 | Witchey ...................... | 70/14 |
| 6,862,904 B1 | 3/2005 | Hubbart | |
| 7,100,937 B2 * | 9/2006 | Hogan ........................ | 280/507 |
| 7,107,799 B1 * | 9/2006 | Marley et al. .............. | 70/14 |
| 7,469,919 B2 * | 12/2008 | Kalous et al. .............. | 280/507 |
| 7,712,763 B2 * | 5/2010 | Lovenberg .................. | 280/507 |
| 2001/0023601 A1 * | 9/2001 | Gilbertson et al. ......... | 70/258 |
| 2003/0167806 A1 * | 9/2003 | Witchey ...................... | 70/14 |
| 2005/0183474 A1 * | 8/2005 | Hillabush et al. ........... | 70/14 |
| 2009/0079163 A1 * | 3/2009 | Cuellar et al. .............. | 280/507 |
| 2010/0095717 A9 * | 4/2010 | Wyers .......................... | 70/14 |

* cited by examiner

*Primary Examiner* — Lloyd Gall
(74) *Attorney, Agent, or Firm* — QuickPatents, Inc.; Kevin Prince

(57) ABSTRACT

A device is disclosed for locking to a gooseneck-type trailer tongue of the type having a lockable tongue mechanism and a lower surface. A ball member has a semi-spherical upper portion and a lower surface. The lower surface is traversed by a threaded aperture. A peripheral side of the upper portion has at least one set screw aperture traversing through to the threaded aperture. A tang is threaded at a top end thereof for threaded rotational engagement with the threaded aperture of the ball member and includes a lower end that has at least one bolt aperture therethrough. A collar member includes a tang slot traversing the top and bottom surfaces thereof. A puck lock has a selectively positionable bolt adapted to traverse the bolt aperture of the tang to lock the collar member onto the tang and ball member. The top surface of the collar member is locked against the lower surface of the trailer tongue to prevent removal of the ball member from the trailer tongue, thereby inhibiting unauthorized towing of the trailer.

9 Claims, 3 Drawing Sheets

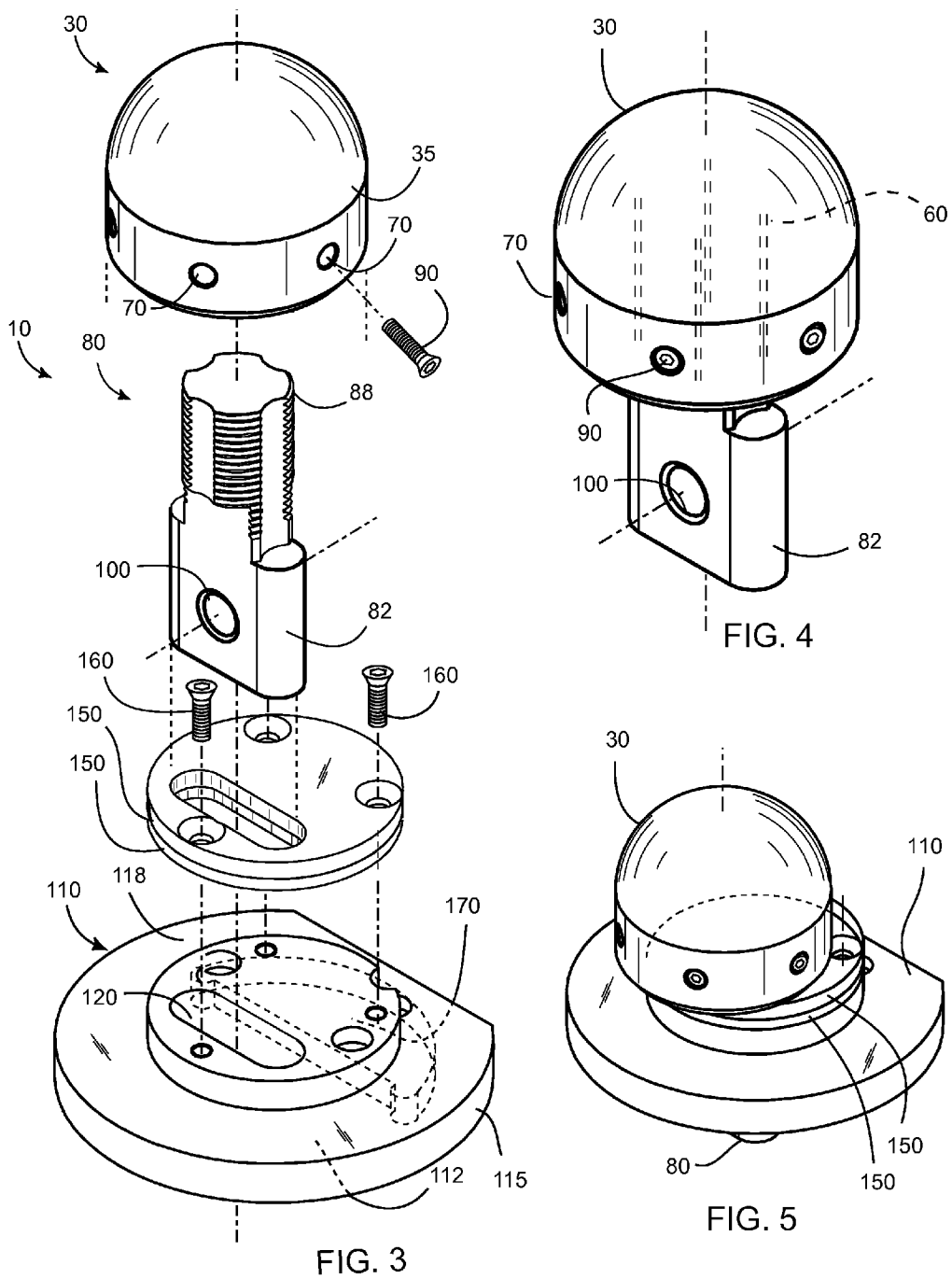

TRAILER LOCK

CROSS-REFERENCE TO RELATED APPLICATIONS

This application is a Continuation-in-Part of U.S. patent application Ser. No. 12/462,446, filed on Sep. 30, 2009 now abandoned, and incorporated herein in its entirety by reference.

FIELD OF THE INVENTION

This invention relates to locks, and more particularly to a device for locking a trailer tongue to inhibit unauthorized towing of the trailer.

DISCUSSION OF RELATED ART

Trailers and other equipment having a gooseneck-style trailer coupler hitch are susceptible to theft. They are easily stolen due to the rather simple method(s) by which they can be towed.

Several prior art devices have been employed in an attempt to prevent the theft of such equipment. The simple premise of typical prior art solutions is to cover the gooseneck receiver so that it cannot be mounted to a hitch in order to couple the attached trailer, equipment or other device to a towing vehicle. Such prior art devices, however, have numerous shortcomings. For example, many have structural weaknesses that can be exploited by would-be thieves, and others expose the locking mechanism unnecessarily. Many such prior art devices are not structurally strong enough to guard against common burglary tools such as pry bars, bolt cutters, sledgehammers, torches, and hacksaws. They also leave the lock or locking mechanism exposed to thieves for easy access in order to defeat the locking device. Further, several prior art devices are relatively expensive to manufacture, and some are too complex to be used easily or conveniently.

Therefore, there is a need for a device that has strong structural integrity so as to prevent the locking mechanism from being defeated. Additionally, it is desirable to provide a gooseneck-type hitch lock that does not leave the lock or locking mechanism exposed for easy access by would-be thieves. Further, such a needed device would provide a gooseneck-type hitch lock that is extremely durable, yet inexpensive to produce. Moreover, such a needed invention would be simple to use, yet extremely tough to defeat. The present invention accomplishes these objectives.

SUMMARY OF THE INVENTION

The present device is a device for locking to a trailer tongue of the type having a lockable tongue mechanism and a lower surface. A ball member has a semi-spherical upper portion and a lower surface. The lower surface is traversed by a threaded aperture. A peripheral side of the upper portion has at least one set screw aperture traversing through to the threaded aperture.

A tang is threaded at a top end thereof for threaded rotational engagement with the threaded aperture of the ball member. The tang further includes a lower end that has at least one bolt aperture therethrough. A collar member has a top surface, a bottom surface, and a peripheral edge. A tang slot traverses the top and bottom surfaces. A puck lock has a selectively positionable bolt adapted to traverse the bolt aperture of the tang to lock the collar member onto the tang and ball member. The puck lock includes a keyed locking mechanism such that only a unique key inserted therein will allow the selective positioning of the bolt.

In use, the ball is inserted into the trailer tongue and the lockable tongue mechanism is locked thereto. The depth of the tang into the threaded aperture may be adjusted by rotating the tang within the threaded aperture, so that the top surface of the collar member contacts the lower surface of the trailer tongue when the ball is locked into the trailer tongue and when the tang is locked to the collar member with the puck lock. The top surface of the collar member is locked against the lower surface of the trailer tongue to prevent removal of the ball member from the trailer tongue, thereby inhibiting unauthorized towing of the trailer.

This invention is novel and different from other devices in that it is structurally far stronger and simpler. A preferred embodiment of the present gooseneck-type trailer hitch lock device is made of solid machined aluminum and hardened steel with substantial thickness that it would take an enormous amount of time to cut through with a hacksaw, for example. The present invention can also be made of other metals such as stainless steel, titanium, iron, or any of the alloys thereof.

Additionally, the present lock device is extremely resistant to high heat such as torch flames. The metal composition that makes up the gooseneck-type trailer hitch lock device tends to bubble when subjected to a torch flame. Application of a torch to defeat this lock device could very well make it more difficult to remove this lock device from the attached object.

In addition, sledgehammers and similar impact tools will not break the instant invention. It is estimated that a healthy, 200-pound adult male could repeatedly strike the present device with an 8-pound sledgehammer for a substantial amount of time without compromising the integrity of the device, based on the experiment conducted by the inventors. More importantly, there are no exposed areas that could be susceptible to bolt cutters to disengage the locking mechanism. Prying devices have no significant area of opportunity in which to apply pressure to the present invention.

The instant lock device is unique because it protects the locking mechanism itself. The locking plate engages and protects the lock in the center of the device. The locking mechanism itself is encompassed by the device and the locking shaft is hidden from view. The lock is not exposed to any threats of prying or cutting.

The present invention is a device that has strong structural integrity so as to prevent the locking mechanism from being defeated. Additionally, the present invention provides a gooseneck-type trailer hitch lock that does not leave the lock or locking mechanism exposed for easy access by would-be thieves. Further, the present device provides a gooseneck-type trailer hitch lock that is extremely durable, yet inexpensive to produce. Such a device is simple to use, yet extremely tough to defeat. Other features and advantages of the present invention will become apparent from the following more detailed description, taken in conjunction with the accompanying drawings, which illustrate, by way of example, the principles of the invention.

DESCRIPTION OF THE DRAWINGS

FIG. 3 is an exploded perspective view of an upper portion of the invention;

FIG. 4 is a perspective view of the ball member and a tang rotationally engaged therewith;

FIG. 5 is a non-exploded perspective view of FIG. 3; and

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
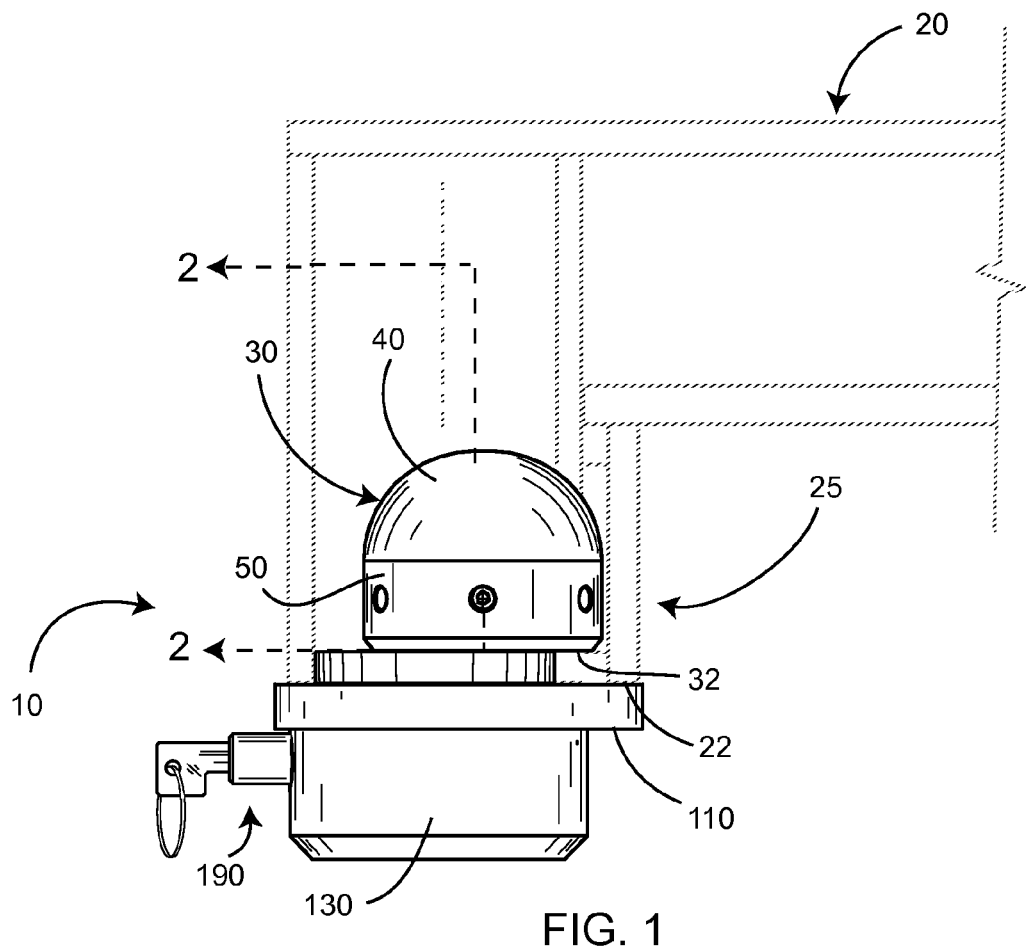
FIG. 1 is a left-side elevational view of the device as mounted to a trailer tongue illustrated in phantom outline.
Figure 2:
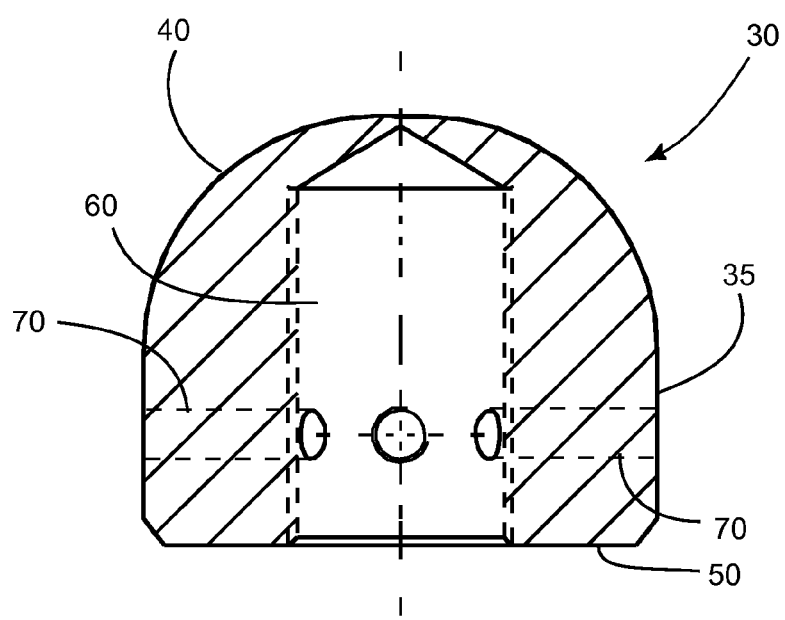
FIG. 2 is a cross-sectional view of a ball member of the invention, taken along lines 2—2 of FIG. 1.

FIGS. 1 and 3 illustrate a device 10 for locking to a gooseneck-type trailer tongue 20 of the type having a lockable tongue mechanism 25 and a lower surface 22. A ball member 30 has a semi-spherical upper portion 40 and a lower surface 50. The lower surface 50 is traversed by a threaded aperture 60. A peripheral side 35 of the upper portion 40 has at least one, and preferably at least four, set screw apertures 70 traversing through to the threaded aperture 60 (FIG. 4).

Figure 6:
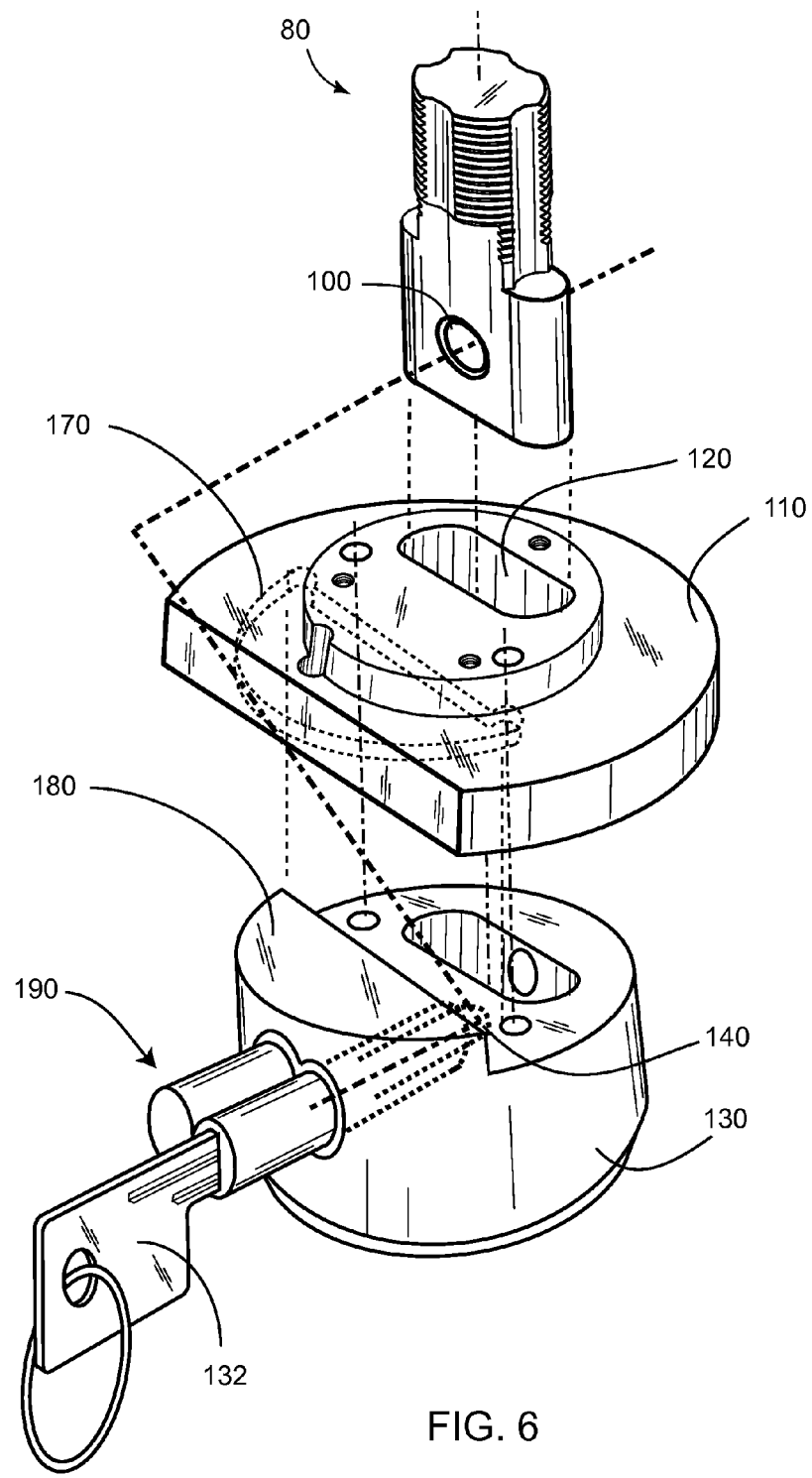
FIG. 6 is an exploded perspective view of a lower portion of the invention.

A tang 80 is threaded at a top end 88 thereof for threaded rotational engagement with the threaded aperture 60 of the ball member 30. At least one set screw 90 is adapted to tighten within the at least one set screw aperture 70 to prevent rotation of the tang 80 with respect to the ball member 30. At least a portion of the tang 80 does not extend to the peripheral edge 35 of the ball member 30 so as to expose at least a portion of the lower surface 32 of the ball member 30. The tang 80 further includes a lower end 82 that has at least one bolt aperture 100 therethrough (FIGS. 4 and 6).

A collar member 110 has a top surface 118, a bottom surface 112, and a peripheral edge 115. A tang slot 120 traverses the top and bottom surfaces 118,112 (FIGS. 3 and 6). A puck lock 130 has a selectively positionable bolt 140 adapted to traverse the bolt aperture 100 of the tang 80 to lock the collar member 110 onto the tang 80 and ball member 30. Preferably the bottom surface 112 of the collar member 110 includes a recess 170 adapted to receive a protrusion 180 of the puck lock 130, such that the puck lock 130 is rotationally keyed to the collar member 110 and tang 80 when locked thereto.

Preferably the ball member 30, tang 80, puck lock 130, spacers 150, and collar member 110 are all made from durable and rigid cast iron, cast aluminum, or a cast metal alloy material. The puck lock 130 preferably includes a keyed locking mechanism 190 such that only a unique key 132 (FIG. 6) inserted therein will allow the selective positioning of the bolt 140.

In use, the ball 30 is inserted into the trailer tongue 20 and the lockable tongue mechanism 25 is locked thereto. The depth of the tang 80 into the threaded aperture 60 may be adjusted by rotating the tang 80 within the threaded aperture 60, so that the top surface 118 of the collar member 110 contacts the lower surface 22 of the trailer tongue 20 when the ball 30 is locked into the trailer tongue 20 and when the tang 80 is locked to the collar member 110 with the puck lock 130. The top surface 118 of the collar member 110 is locked against the lower surface 22 of the trailer tongue 20 to prevent removal of the ball member 30 from the trailer tongue 20, thereby inhibiting unauthorized towing of the trailer.

The collar member 110 may further include a plurality of spacers 150 (FIG. 3) fixable to the top surface 118 thereof with a plurality of mechanical fasteners 160, such as machine screws, so that the distance between the bottom surface 32 of the ball member 30 and the upper surface of the collar member 110 may be adjusted to that required by the lockable tongue mechanism 25 of the trailer and the lower surface 22 of the trailer tongue 20 (FIG. 1). Each spacer 150 preferably takes the form of a circular disk having one of the tang slots 120 therethrough and aligned with the tang slot 120 of the collar member 110 when fixed with the collar member 110 (FIGS. 3 and 5).

While a particular form of the invention has been illustrated and described, it will be apparent that various modifications can be made without departing from the spirit and scope of the invention. For example, the shape of the tang 80 and the tang slots 120 are illustrated as rounded rectangles, but could be any suitable non-circular shape. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device for locking to the tongue of a trailer of the type having a lockable tongue mechanism and a lower surface, comprising:
   a ball member having a semi-spherical upper portion and a bottom surface, the bottom surface traversed by a threaded aperture, a peripheral side of the upper portion having at least one set screw aperture traversing through to the threaded aperture;
   a tang threaded at a top end thereof for threaded rotational engagement with the threaded aperture of the ball member, at least one set screw adapted to tighten within the at least one set screw aperture to prevent rotation of the tang with respect to the ball member, at least a portion of the tang not extending to the peripheral side of the ball member so as to expose at least a portion of the bottom surface of the ball member, the tang further including at a lower end thereof at least one bolt aperture therethrough;
   a collar member having a top surface, a bottom surface, and a peripheral edge, a tang slot traversing the top and bottom surfaces;
   a puck lock having a selectively positionable bolt adapted to traverse the bolt aperture of the tang to lock the collar member onto the tang and ball member;
   whereby with the ball member inserted into the trailer tongue and the lockable tongue mechanism locked thereto, the top surface of the collar member can be locked against a lower surface of the trailer tongue to prevent removal of the ball member from the trailer tongue to inhibit unauthorized towing of the trailer.

2. The device of claim 1 wherein the collar member further includes a plurality of spacers fixable to the top surface thereof with a plurality of mechanical fasteners, such that the distance between the bottom surface of the ball member and the top surface of the collar member may be adjusted to that required by the lockable tongue mechanism of the trailer and the lower surface of the trailer tongue.

3. The device of claim 2 wherein each spacer takes the form of a circular disk having a tang slot therethrough and aligned with the tang slot of the collar member when fixed with the collar member.

4. The device of claim 1 wherein the bottom surface of the collar member includes a recess adapted to receive a protrusion of the puck lock, whereby the puck lock is rotationally keyed to the collar member and tang.

5. The device of claim 1 wherein the ball member, tang, and collar member are made from cast iron.

6. The device of claim 1 wherein the ball member, tang, and collar member are made from cast aluminum.

7. The device of claim 1 wherein the ball member, tang, and collar member are made from a cast metal alloy material.

8. The device of claim 1 wherein the peripheral side of the ball member includes at least four of the set screw apertures.

9. The device of claim 1 wherein the puck lock includes a keyed locking mechanism, such that only a unique key inserted therein will allow the selective positioning of the bolt.

* * * * *